United States Patent [19]

Markarian et al.

[11] 4,326,237
[45] Apr. 20, 1982

[54] DUAL AC MOTOR-RUN CAPACITORS

[75] Inventors: Paul M. Markarian, North Adams, Mass.; David C. Howe, Stamford, Vt.

[73] Assignee: Sprague Electric Company, North Adams, Mass.

[21] Appl. No.: 221,967

[22] Filed: Jan. 2, 1981

[51] Int. Cl.³ .............................................. H01G 4/38
[52] U.S. Cl. .................................. 361/329; 361/272; 361/328
[58] Field of Search ........................ 361/272, 328, 329

[56] References Cited

U.S. PATENT DOCUMENTS

| 2,758,259 | 8/1956 | Peck | 317/230 |
| 2,775,730 | 12/1956 | Eilenberger et al. | 320/1 |
| 3,248,617 | 4/1966 | Hynes et al. | 317/242 |
| 3,921,041 | 11/1975 | Stockman | 317/260 |
| 4,209,815 | 6/1980 | Rollins et al. | 361/15 |

FOREIGN PATENT DOCUMENTS

| 1291291 | 10/1972 | United Kingdom | 361/272 |
| 2023931 | 1/1980 | United Kingdom | 361/329 |

Primary Examiner—Elliot A. Goldberg
Attorney, Agent, or Firm—Connolly and Hutz

[57] ABSTRACT

A daul AC motor-run capacitor has a pair of oval plastic end caps to hold round would capacitor sections in place in an oval can. Each cap has upstanding pins to engage the ends of each capacitor section and hold it firmly in place. The upper cap has at least one slot therein for the passage of an electrode tab from the wound sections for connection to at least one terminal. The bottoms of the sections are electrically connected and provided with a common electrode tab. When the can and cover are metal, this common tab passes through an insulative sleeve along the length of the sections for connection to its terminal.

9 Claims, 7 Drawing Figures

U.S. Patent  Apr. 20, 1982  4,326,237
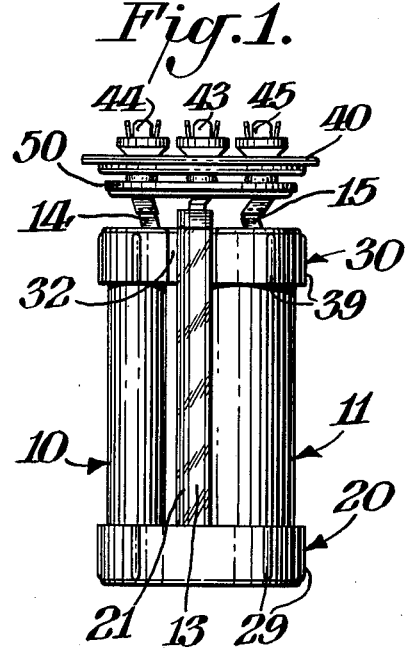
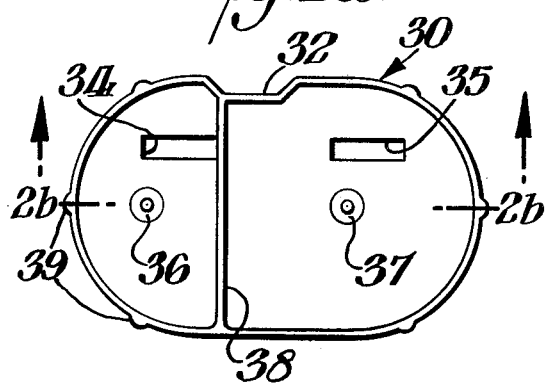
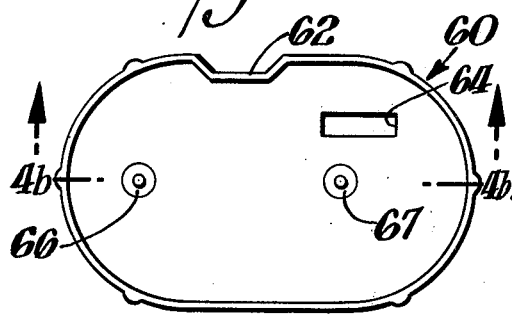
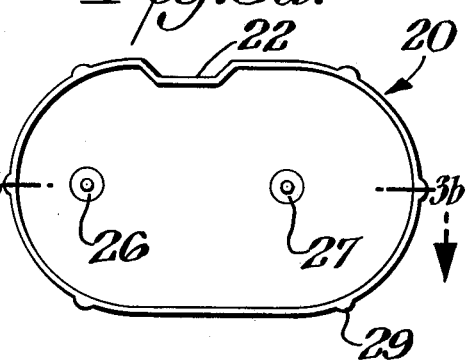
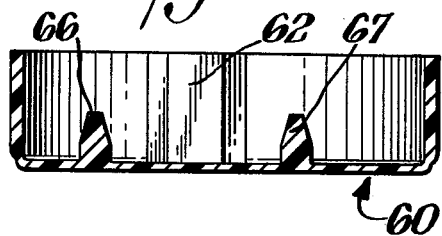
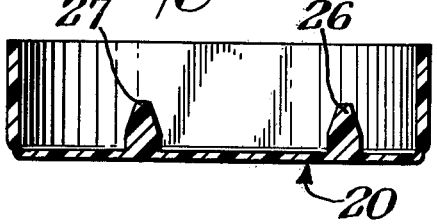

DUAL AC MOTOR-RUN CAPACITORS

BACKGROUND OF THE INVENTION

This invention relates to a dual AC motor-run capacitor housed in an oval can. More particularly, this invention relates to an insulative plastic end cap design to hold two or more round wound capacitor sections firmly in an oval metal can.

Wound capacitor sections have been housed in oval cans in the prior art. Frequently round sections have been flattened into an oval shape to conform to the shape of the can, or the sections have been wound on a flat mandrel to provide the oval shape.

Manufacturers of air conditioning and refrigeration units prefer an oval shape to a round shape for ease in mounting and space considerations. Since it is preferable for metallized film capacitor sections to be round, the best volumetric efficiency is obtained by using two or more round capacitor sections in an oval can rather than a single unit.

When two round capacitor sections are encased in an oval can, there is a problem of movement of the sections within the can, e.g., from motor vibrations. There has also been a problem of insulating the capacitor sections from each other and from the can when the can is metal and not part of the circuit. In the past, insulating and packing sheets that had to be cut to shape and wrapped, folded or wadded and put into place were used to provide the required insulation.

SUMMARY OF THE INVENTION

A feature of this invention is the provision of an AC motor-run capacitor having plastic molded end caps that firmly hold capacitor sections in place. Another feature is the provision of such end caps for metal cans, to replace separate wrapped and folded insulation sheets.

The end caps of this invention are molded with upstanding pins that engage the winding cores of a plurality of individual capacitor sections, holding them firmly in place within an oval can. Preferably, the exterior sides of the end caps are ribbed to ensure a snug fit of the units within the oval housing or can. The ribs also prevent a piston effect when the assembled units are put into the can.

One of the end caps of this invention, the upper one, has at least one slot therein for passage of an electrode tab. There is an indentation along one of the long sides of the oval cap for another electrode tab to hold this tab in place and prevent its being crushed against the can.

BRIEF DESCRIPTION OF THE DRAWINGS

FIG. 1 is a side-elevational view of a capacitor of the present invention utilizing two different sizes of wound capacitor sections.

FIG. 2a is a bottom plan view and FIG. 2b a cross-sectional view taken through FIG. 2a along the line 2b—2b of one embodiment of the upper end cap.

FIG. 3a is a bottom plan view and FIG. 3b a cross-sectional view taken through FIG. 3a along the line 3b—3b of the bottom end cap.

FIG. 4a is a bottom plan view and FIG. 4b a cross-sectional view taken through FIG. 4a along the line 4b—4b of a second embodiment of the upper end cap.

DESCRIPTION OF THE PREFERRED EMBODIMENTS

A dual AC motor-run capacitor is portrayed in FIG. 1 with end caps 20 and 30 and a cover assembly 40 to be housed in an oval can (not shown). The capacitor has at least two wound round metallized film capacitor sections 10 and 11 that fit into end caps 20 and 30. A common electrode tab 13 is connected to one end of both sections 10 and 11, hereinafter called the bottom end. Tab 13 is encased in insulative sleeve 21 and extends from the interior of end cap 20 along the length of sections 10 and 11 and adjacent indentation 32 on the exterior of cap 30, hereinafter called the upper end cap. Terminals 43, 44 and 45 are rigidly attached to cover 40 and extend through it to a substantially non-flexible plate 50. Electrode tabs 13, 14 and 15 are attached, preferably by welding, to the respective terminals 43, 44 and 45 through plate 50. The resulting unit is sealed within an oval can and immersed in dielectric fluid. The conventional fill hole in the cover 40 is thereafter sealed, finishing the assembly.

Electrode tab 14 attached to the upper end of section 10 and electrode tab 15 attached to the upper end of section 11 pass through slots or windows 34 and 35, respectively, in end cap 30 and are attached to terminals 44 and 45, respectively, as described above.

In the embodiment shown in FIG. 1, there is a longitudinal partition 38 shown in FIGS. 2a and 2b dividing the upper end cap 30 into two separate insulated compartments. When, as shown, the sections are of different diameter, the larger diameter section sets the position of the partition and the indentation. The exterior sides of end caps 20 and 30 bear ribs, indicated at 29 and 39, respectively, in FIGS. 1, 2a, and 3a, to insure a snug fit in the oval can (not shown).

As shown in FIGS. 2 and 3, end caps 20 and 30 have upstanding pins 26 and 27, and 36 and 37, respectively, molded therein that are dimensioned so as to be snapped into the hollow winding cores of sections 10 and 11 to hold them in place. These pins or pegs are located along the major axis of the oval cap when there are two pins. Snapping the sections onto the pins forms an assembly which can then be processed further either inside or outside of the container and may be easily removed from the container if need be.

Bottom end cap 20 is shown in FIG. 3a to have an indentation 22. This indentation need not be present, but is present for reasons of economics, i.e., the same side molds may be used for the upper and lower end caps.

FIGS. 4a and 4b show another embodiment of the upper end cap. Upper end cap 60 is provided with indentation 62 and a pair of pegs 66 and 67. This embodiment is used when the top of the capacitor sections are connected and there is a single common electrode tab from the top of the sections that passes through slot 64. In this form, the cover will bear only two terminals, and the tab that passes through slot 64 is attached to one of them. The common tab from the bottom of the capacitor sections that passes adjacent indentation 62 is attached to the other.

When a metal can is used, the common tab from the bottom of the capacitor sections will always be in an insulative sleeve in order to keep the can isolated, i.e., not a part of the circuit. Such isolated cans are used whenever the terminals will be operating at a potential different from ground potential.

Although the invention has been described in terms of two wound units of different diameters, wound units of the same diameter may be used. When units of the same diameter are used, the spacing between the pegs must be altered, and the position of the indentation must be changed as must the position of the partition if one is needed.

Preferably, the ends of the wound sections are metal sprayed, and the electrode tabs are welded to the sprayed ends. The bottom ends of the wound section are connected by a welded strap, and the common electrode tab is welded to the strap.

The indentation in the upper end cap replaces a slot in the cap and also gives the cap more rigidity and more reliable insulating properties. The indentation also ensures that the tab will not be squeezed between the cap and the can.

When the capacitor sections are made of aluminized polypropylene film, the end caps are preferably made of talc filled polypropylene. The can and cover are preferably steel or aluminum. In this way, there is no contamination of the impregnating dielectric fluid fill, as all parts are either polypropylene or aluminum, or compatible therewith.

The end caps replace up to eleven separate insulating sheet pieces, and their use greatly simplified assembly of the units. With slight modification of the end caps (pin and indentation location and number of slots) either a single rated capacitor can be made from two sections with common electrode tabs or a dual-rated unit can be made for running two different size motors, e.g., a fan and a compresser.

It is also possible, utilizing one bottom end cap and three upper end caps, to make a stacked unit of four sections in one ovalcase. In such a design, the bottom two capacitor sections are mounted in a solid bottom end cap and have a regular top end cap. The upper two capacitor sections are mounted between two slotted end caps so that the tabs from the bottom two sections can be connected to the upper sections. Other permutations and combinations are possible also.

What is claimed is:

1. A dual AC motor-run capacitor comprising at least two round metallized electrode film capacitor sections having hollow winding cores, a pair of oval plastic insulative end caps having two long sides are cap an upper cap, the upper of said end caps having at least one slot therein and an indentation along one of the long sides thereof, each of said end caps having at least two upstanding pins engaging said hollow winding cores to hold said sections side-by-side, electrode tabs connecting the electrodes of said sections to terminals mounted in a cover, one of said tabs passing through said slot in said upper end cap, said sections mounted in said end caps being placed in an oval can and sealed with said cover.

2. A capacitor according to claim 1 wherein one end of one of said sections is connected electrically to the corresponding end of the second of said sections, and the opposite end of said one section is electrically connected to the opposite end of said second section, one of said tabs is connected to one of said connected ends and is common to both said sections and extends from the upper end of both said sections through said slot and is connected to one of said terminals, and another of said tabs is connected to said opposite ends and is common to both said sections and extends from the bottom end of said sections through an insulative sleeve along the length of both sections through said indentation, and is connected to a different one of said terminals.

3. A capacitor according to claim 1 wherein said sections are electrically connected along the bottoms thereof and to a tab extending through an insulative sleeve and connected to one of said terminals, said upper end cap having two slots in the top thereof and a longitudinal divider between said pins and said slots partitioning said cap into two insulated portions, one of said sections fitting one of said portions engaging the pin therein, the other of said sections fitting into the other of said portions and engaging the pin therein, an electrode tab connected to each of said sections and passing through the respective slot in each portion and connected to separate terminals.

4. A capacitor according to claim 3 wherein said sections are of different diameters and said upper end cap is divided into portions unequal in size.

5. A capacitor according to claim 1 wherein said sections are impregnated with dielectric fluid.

6. A capacitor according to claim 1 wherein said sections are metallized polypropylene sections and said end caps are polypropylene.

7. A capacitor according to claim 1 wherein the exterior sides of said caps bear ribs to ensure a snug fit in said can.

8. A capacitor according to claim 1 wherein said can and said cover are metal.

9. A capacitor according to claim 1 wherein each of said end caps has two upstanding pins, said pins lying on the major axis of said end caps.

* * * * *